United States Patent [19]

McGarry et al.

[11] Patent Number: 5,428,105
[45] Date of Patent: Jun. 27, 1995

[54] LOW-PROFILE ADDITIVES FOR THERMOSETTING POLYESTER COMPOSITIONS

[75] Inventors: Frederick J. McGarry, Weston; Mary B. Chan-Park, Cambridge, both of Mass.

[73] Assignee: GenCorp Inc., Fairlawn, Ohio

[21] Appl. No.: 329,586

[22] Filed: Oct. 26, 1994

Related U.S. Application Data

[62] Division of Ser. No. 10,933, Jan. 29, 1993, Pat. No. 5,376,721.

[51] Int. Cl.[6] .................. C08L 9/00; C08L 9/06; C08L 53/02
[52] U.S. Cl. ........................ 525/69; 525/71; 525/74; 525/78; 525/86; 525/87; 525/285; 525/313; 525/316
[58] Field of Search ............ 525/69, 71, 74, 78, 525/87, 86, 285, 313, 316

[56] References Cited

U.S. PATENT DOCUMENTS 2,750,314  6/1956  Bemmels .

(List continued on next page.)

FOREIGN PATENT DOCUMENTS

| 0234902 | 9/1987 | European Pat. Off. . |
| 0242027 | 10/1987 | European Pat. Off. . |
| 0273522 | 6/1988 | European Pat. Off. . |
| 0310167 | 5/1989 | European Pat. Off. . |
| 0317628 | 5/1989 | European Pat. Off. . |
| 305159 | 12/1988 | Japan . |
| 2165548 | 4/1986 | United Kingdom . |

OTHER PUBLICATIONS

*Database WPI* Sep. 1992, Derwent Publications LTD, London, GB: AN 92-354793 & JP-A-258 637 (Dainippon Ink & Chem KK) 14 Sep. 1992, "Abstract".
*Database WPI,* Week 9223, Derwent Publications Ltd, London, GB; AN 92-188159 & JP-A-4 121 756 (Fjuitsu Ltd) 22 Apr. 1992, "Abstract".
*Journal of Applied Polymer Science,* vol. 31, No. 1, Jan. 1986. New York, USA, pp. 55-63. Subhas C, Shit, Beni Madhab Mahoto, Mrinal M. Miati, Sukumar Maitt "New Block Copolymers II. Synthesis and Characterization of an ABA-Type Block Copolymer", "Abstract".

*Primary Examiner*—Patricia A. Short
*Attorney, Agent, or Firm*—Robert F. Rywalski; Samuel B. Laferty; Frank C. Rote, Jr.

[57] ABSTRACT

A curable polyester molding composition incorporating an elastomeric low profile additive dispersed in voided rubbery particle form throughout the composition is used in association with a compatibilizing agent to form a molded thermoset article having very smooth light reflective, class A surfaces and having a matrix fracture energy which is comparable to articles formed from similar or identical molding compositions which are free of low profile additives. The low profile additive is an epoxidized elastomer or block copolymer having at least one flexible elastomer block and one monovinyl aromatic block. The compatibilizing agent is a copolymer having a diene polymer backbone which is compatible with the elastomer or the flexible diene block of the low profile additive, with constituents which are compatible or reactive with the polyester being grafted or adducted onto the diene polymer backbone. The compatibilizing agent improves the solubility of the low profile additive in the uncured molding composition to promote good dispersion, to promote and maintain small particle size of the low profile additive, and to enhance compatibility between the cured polyester matrix and the low profile additive, thereby providing a low profile mechanism wherein shrinkage compensation during curing of the composition occurs almost exclusively through voiding of the small tough elastomeric particles of the low profile additive dispersed in the cured polyester matrix.

6 Claims, No Drawings

U.S. PATENT DOCUMENTS

| | | |
|---|---|---|
| 2,829,131 | 4/1958 | Greenspan et al. . |
| 2,838,478 | 6/1958 | Hillyer et al. . |
| 3,119,711 | 1/1964 | Starmann . |
| 3,429,951 | 2/1969 | Childers . |
| 3,437,517 | 4/1969 | Eilerman . |
| 3,538,043 | 11/1970 | Herold . |
| 3,555,112 | 1/1971 | Winkler . |
| 3,651,014 | 3/1972 | Witsiepe . |
| 3,718,714 | 2/1973 | Comstock . |
| 3,827,230 | 8/1974 | Marzocchi et al. . |
| 3,888,645 | 6/1975 | Marzocchi . |
| 4,020,036 | 4/1977 | South, Jr. . |
| 4,031,165 | 6/1977 | Saiki et al. . |
| 4,051,199 | 9/1977 | Udipi et al. . |
| 4,076,767 | 2/1978 | Samejima . |
| 4,131,725 | 12/1978 | Udipi . |
| 4,242,415 | 12/1980 | Feltzin et al. . |
| 4,255,299 | 3/1981 | Daimon . |
| 4,290,939 | 9/1981 | Bertsch . |
| 4,309,473 | 1/1982 | Minamisawa et al. . |
| 4,329,438 | 5/1982 | Yamori et al. . |
| 4,341,672 | 7/1982 | Hsieh et al. . |
| 4,413,072 | 11/1983 | Hess . |
| 4,419,487 | 12/1983 | Rowe . |
| 4,478,963 | 10/1984 | McGarry . |
| 4,515,710 | 5/1985 | Cobbledick . |
| 4,524,178 | 1/1985 | Hefner et al. . |
| 4,530,962 | 7/1985 | Alexander . |
| 4,562,115 | 12/1985 | Hergenrother . |
| 4,748,064 | 5/1988 | Harpell et al. . |
| 4,783,544 | 11/1988 | Yokoshima et al. . |
| 4,833,210 | 5/1989 | Fujii et al. . |
| 4,851,474 | 7/1989 | Willis . |
| 4,851,476 | 7/1989 | Willis . |
| 4,913,955 | 4/1990 | Noda et al. . |
| 4,970,265 | 11/1990 | Willis . |
| 4,981,916 | 1/1991 | Willis . |
| 5,084,508 | 1/1992 | Kagaya et al. . |
| 5,122,553 | 6/1992 | Takayama et al. . |

LOW-PROFILE ADDITIVES FOR THERMOSETTING POLYESTER COMPOSITIONS

CROSS REFERENCE

This is a division of application Ser. No. 08/010,933 filed Jan. 29, 1993, now U.S. Pat. No. 5,370,721, of Frederick J. McGarry and Mary B. Chan-Park, for "Low-Profile Additive for Thermosetting Polyester Compositions."

FIELD OF THE INVENTION

The invention relates to curable molding compositions and to a process for utilizing the same to form molded thermoset articles which undergo low or practically no shrinkage during curing, which are characterized by a very smooth surface, and which have excellent mechanical properties generally because of their morphology. More particularly, the invention concerns the use of certain modified elastomers as low profile additives to compensate for shrinkage during the curing of unsaturated polyester thermoset compositions, thereby keeping the surface of the molding composition in contact with the mold surface to provide a cured article which has a smooth surface without significantly reducing the fracture toughness or other mechanical properties as compared with molded thermoset articles formed from unsaturated polyester compositions which are free of any low profile additives.

BACKGROUND

Because of its relatively low cost and inherently high strength to weight ratio, polyester molding compounds, including sheet molding compounds and thick molding compounds, are being utilized with increasing regularity in the automotive and appliance industry as a replacement for steel. These molding compounds generally comprise unsaturated polyester resin, a crosslinking agent such as styrene, reinforcing fibers such as glass fibers, fillers, a catalyst to enhance curing and various other additives. For applications wherein a smooth Class A surface finish is required, such as for automotive body panels, low profile additives which offset the shrinkage effects of thermosetting polyester molecules during crosslinking are used. These low profile additives counteract the effects of shrinkage to prevent the molding composition from pulling away from the mold surface which would cause waviness, voids or other surface irregularities.

Conventional low profile additives used for reducing shrinkage and for providing improved surface finish for thermosetting resin systems generally fall within one of two major categories. A first general category includes additives which are compatible with the precrosslinked thermosetting system. Examples of low-profile additives which are compatible with styrene crosslinkable unsaturated polyester systems prior to cure include polyvinyl acetate, polycaprolactone, and polyurethane. Compatible low-profile additives, particularly polyvinyl acetate, have been found to achieve excellent low-profile effect, exhibiting low or zero shrinkage and providing good surface appearance. However, such systems usually exhibit significant reductions in mechanical properties such as fracture toughness, tensile strength, modulus and strain to failure and the same is attributable to the morphology which arises from the mechanism by which low-profile effect is achieved. During the early stages of curing for a thermosetting resin system, employing a compatible low-profile additive, as crosslinking proceeds, a high molecular weight polymer network is formed which phase separates from the initial solution and forms spherical microgels or nodules with the initially compatible low-profile additive and unreacted crosslinker and resin forming a continuous phase. As the cure progresses to a more advanced stage, the nodules grow and form a macro-network structure wherein individual nodules are connected to neighboring nodules by comparatively small resin bridges, with the surrounding continuous phase, largely depleted of resin and crosslinker, now comprising mostly the low-profile additive. During the latter stages of the cure, the crosslinked polymer having a macro-network structure begins to shrink creating stresses which are transferred to the continuous, low-profile additive phase, causing the formation of microvoids or cavitations in the low-profile additive continuous phase. The final cured composition can be described as having a popcorn-like structure or morphology wherein the crosslinked domains comprise nodules, each of which is coated with a thin film of the cavitated low-profile additive and is connected to neighboring nodules by relatively small bridges of crosslinked resin. The greatly reduced continuity of the phases and the ease with which the bridges can be broken explains the severe reduction in mechanical properties.

Thus, while conventional compatible low-profile additives such as polyvinyl acetate are very popular because of their excellent shrinkage compensation effects and because of the high quality surfaces produced therewith, their use is limited by the resulting morphology which leads to reduced toughness and strength.

The second major category of low-profile additives are those additives which are noncompatible with the initial precrosslinked thermosetting resin systems. Examples of noncompatible low-profile additives include polyethylene, polystyrene, polymethylmethacrylate, polyvinyl chloride, butadiene and block copolymers of styrene and butadiene. The noncompatible low-profile additives function differently from the compatible additives and provide an entirely different morphology and mechanism for achieving shrinkage compensation and low profile effect. Noncompatible low-profile additives when used with pre-crosslinked thermosetting resin systems become dispersed as discrete particles within a continuous phase comprising the crosslinker and crosslinkable resin, and ultimately provide a structure wherein the low-profile additive is dispersed as a discrete discontinuous second phase within a continuous crosslinked polymeric matrix. Noncompatible low-profile additives generally have been found to provide better mechanical properties than the compatible low-profile additives, but do not achieve -comparable low-profile effect. Other disadvantages with conventional noncompatible low-profile additives is that because they are noncompatible, i.e. insoluble, with the pre-cured thermosetting solution, the low-profile additive particles can tend to segregate and agglomerate leading to nonuniform properties and surface appearance and paint adhesion problems. Moreover, such additives generally have high molecular weights and consequently form large particles, which, like agglomeration, create surface appearance and paint adhesion problems. Also, the large particles of conventional noncompatible low-profile additives may not be well bonded to the surrounding crosslinked polymer matrix leading to cavitation at the interface between the particles and the matrix, which is less effective for arresting crack propagation than cavitation within the particle.

Thus, while conventional noncompatible low-profile additives achieve a better morphology than conventional compatible low-profile additives, which leads to better mechanical properties, they do not provide very low or zero shrinkage as do the compatible additives. Also, typically they have surface appearance and paint adhesion problems which often preclude their use despite some improvement in mechanical properties.

Accordingly, given the present state of the art, it would be highly desirable to create an additive for thermosetting polymeric composition which counteracts shrinkage during the cure and provides a class A surface finish, while at the same time retaining the good mechanical properties of the polyester.

SUMMARY OF THE INVENTION

It has been discovered that certain elastomers, when appropriately modified and used with a suitable compatibilizing agent, are capable of acting as effective low profile additives for unsaturated polyester thermosetting compositions. The low profile additives of the invention when used in combination with a suitable compatibilizing agent form small discrete domains within a continuous crosslinked polyester matrix during curing of the thermosetting composition, with cavitation and shrinkage compensation occurring substantially within the discrete elastomeric domains thereby preventing the mold composition from drawing away from the interior surfaces of the mold, and consequently providing a very smooth, highly reflective class A surface finish. More importantly, excellent surface characteristics are obtained without significantly sacrificing mechanical properties because shrinkage compensation occurs entirely within a relatively tough elastomeric phase which is dispersed throughout the matrix as a discrete discontinuous phase, i.e. small particles. Because of the resulting morphology, the molded article has better mechanical properties than an article formed with conventional low profile additives, while achieving excellent surface characteristics.

DETAILED DESCRIPTION

The elastomers used to form the low profile additives of the invention can be homo- or copolymer elastomers, or thermoplastic di-, tri- or multiblock copolymers, that is, A-B type diblock copolymers, A-B-A triblock copolymers, or A$\left(\text{B-A}\right)_n$ multiblock copolymers wherein n is from 2 to about 8, or mixtures thereof, having at least one flexible "B" block which is generally a homopolymer of a conjugated diene, or a copolymer of two or more conjugated dienes, or a copolymer of at least one conjugated diene and various other addition polymerizable monomers. Preferably, the elastomers or block copolymers used to form the low profile additives of the invention are generally thermoplastic elastomers having a flexible block or segment containing olefinic unsaturation.

Examples of suitable elastomer homo- or copolymers include those made from one or more conjugated diene monomers having from 4 to 12 carbon atoms with polybutadiene and polyisoprene being preferred and have a molecular weight of from 15,000 to 200,000 and preferably from about 50,000 to about 150,000.

Suitable conjugated diene monomers for making the flexible block of the block copolymer contain from about 4 to about 12 carbon atoms, and more preferably from about 4 to about 8 carbon atoms. Specific examples of suitable diene monomers include 1,3-butadiene, chloroprene, isoprene, 2,3-dimethyl-1,3 butadiene, piperylene, 3-butyl-1,3-octadiene, 2-phenyl-1,3-butadiene, and the like and mixtures thereof. Especially preferred is 1,3-butadiene due to its availability, effectiveness and favorable cost. The flexible block or blocks can generally have a molecular weight of from about 15,000 to about 120,000, and more desirably a molecular weight of from about 50,000 to about 100,000. Molecular weights above 120,000 may be too viscous to be of practical utility.

The block copolymers used to form some low profile additives of the invention, in addition to having at least one flexible block, generally have at least one "A" monovinyl aromatic block. The monovinyl aromatic block or blocks generally have a molecular weight of from about 10,000 to about 50,000, and more preferably from about 15,000 to about 40,000, with lower molecular weights being preferred, i.e. 10,000 to about 30,000, and more preferably from about 15,000 to about 25,000 for each flexible block of a di-, tri- or multiblock copolymer. The monovinyl aromatic A blocks are generally polymerized from monomers containing from about 8 to about 12 carbon atoms. Examples of suitable monomers include styrene, α-methylstyrene, 3-methylstyrene, 4-n-propylstyrene, and the like, with styrene being preferred because of its availability and effectiveness.

The block copolymers used to form some low profile additives of the invention can be prepared according to various methods well known in the art such as are disclosed in U.S. Pat. Nos. 2,975,160; 3,265,765; and 3,280,084. Polymerization of the block copolymers can be hydrocarbyl alkali metal initiated, or free radical initiated. The polymerization of the block copolymers can be by solution, suspension or emulsion processes, and can be conducted as a batch process, as a continuous process, or a combination thereof. Additionally, various commercially available block copolymers having a monovinyl aromatic block and a conjugated diene block can be utilized. Examples of commercially available block copolymers suitable for use with the invention include, for example, an approximately 50 percent styrene-butadiene diblock/50 percent styrene-butadiene-styrene triblock mixture available from the Shell Chemical Company and sold under the trademark "Kraton D1300X"; a styrene-butadiene diblock/triblock copolymer mixture also available from Shell Chemical Company and sold under the trademark "Kraton DX1118" and a styrene-butadiene multiblock star copolymer available from the Firestone Synthetic Rubber Company and sold under the trademark "Stereon 840A."

The disclosed elastomers used to form the low profile additives of the invention are generally modified to improve compatibility between the low profile additive and the crosslinked polyester matrix into which it is added. The preferred method of modifying the elastomers to obtain an effective low profile additive in accordance with the invention is to epoxidize a sufficient quantity of the olefinic double bonds in the flexible block or blocks to substantially prevent or drastically reduce shrinkage during curing of the thermoset composition to provide a cured molded article having smooth, highly reflective surfaces. The degree of epoxidation is generally from about 0.5 percent to about 30 percent, desirably from about 1 percent to about 15 percent, and preferably from about 2 percent to about 10 percent of the total number of unsaturated groups in the flexible B block.

Epoxidation of the diene is generally effected by various known methods such as reaction with an oxidizing agent such as a peracid such as m-chloroperbenzoic acid, peracetic acid, or with hydrogen peroxide in the presence of a carboxylic acid such as acetic acid or formic acid with or without a catalyst such as sulfonic acid, p-toluene sulfonic acid, phosphoric acid and the like. Carboxylic anhydrides can be employed as an alternative to the corresponding carboxylic acids to provide a higher concentration of peracids formed in situ than for the corresponding carboxylic acids. The preferred oxidizing agent for epoxidizing the elastomers to form the low profile additives of the invention is meta-chloroperbenzoic acid.

A solvent for both the oxidizing agent and the elastomeric block copolymer to be epoxidized is required. Suitable solvents for epoxidizing the block copolymer generally include aromatic solvents such as chlorobenzene and the like. The presently preferred solvent for use with the meta-chloroperbenzoic acid is 1,2-dichloroethane.

Known methods for epoxidizing a diene polymer or diene blocks of a block copolymer which can be used in practicing the invention are generally disclosed, for example, in U.S. Pat. Nos. 4,051,199; 4,131,725; 4,341,672 and 4,833,210, and in the following articles: 1) "Catalytic Epoxidation of Styrene-Butadiene Triblock Copolymer with Hydrogen Peroxide", Xigao Jian and Allan S. Hay, Dept. of Chemistry, McGill University, Montreal, Quebec, "Journal of Polymer Science: Part A: Polymer Chemistry", Vol. 29, pp. 1183-1189 (1991) John Wiley & Sons, Inc.; 2) "Epoxidation of Polybutadiene and Styrene-Butadiene Triblock Copolymers with Monoperoxyphthalic Acid: Kinetic and Conformation Study" Wen-Kuei Huang, Ging-Ho Hsiue, and Wei-Hsin Hou, Dept. of Chemical Engineering, National Tsing Hua University, Hsinchu 30043, Taiwan, Republic of China, "Journal of Polymer Science: Part A: Polymer Chemistry", Vol. 26, pp. 1867-1883 (1988) John Wiley & Sons, Inc.; and 3) "Epoxidation of Bromostyrene—Butadiene Coteloimers", H. N. Nae, M. Goldman, and D. Vofsi, Dept. of Materials Research, The Weizmann Institute of Science, Rehovot, Israel, "Journal of Polymer Science: Part A: Polymer Chemistry" Vol 24, pp. 1239-1249 (1986) John Wiley & Sons, Inc.

The preferred method of epoxidizing the elastomers to form the low profile additives of the invention involves separately dissolving the oxidant and elastomer in suitable solvents at room temperature, then adding the oxidant to the elastomer at a subambient temperature such as about −20° C., thoroughly mixing the dissolved oxidant and elastomer, then heating in an inert atmosphere to an elevated temperature, preferably between about 35° C. and about 50° C. to react the oxidizing agent with the unsaturated backbone and epoxidized same. The by-product is an acid which can be removed by various known means such as solvent extraction. The epoxidized elastomer can also be isolated by methods such as coagulation and steam stripping.

The amount of low profile additive used to eliminate shrinkage and to produce a cured article having very smooth, Class A surfaces, and generally ranges from about 3 to 20 percent by weight, desirably from 5 to 15 percent by weight, and preferably from 7 to about 12 percent by weight based upon the total weight of the thermosetting composition without fillers or fibers, i.e. based upon the total weight of the unsaturated polyester, the styrene or other crosslinking agent, and the low profile additive. This level provides another important advantage of the invention since it is approximately one-half of the amount of polyvinyl acetate low profile additives required by the prior art.

In accordance with another aspect of the invention, the oxirane groups of the epoxidized elastomers can be further reacted with low molecular weight monocarboxyl or monohydroxyl terminated unsaturated polyester oligomers to form a graft copolymer with the unsaturated polyester chains being grafted to the flexible epoxidized elastomer. The monofunctional terminated unsaturated polyesters which can be used to form the graft copolymer are generally well known in the art and are generally similar to the hereinafter described unsaturated polyesters used as the matrix material for the thermoset compositions. An example of a suitable monocarboxyl terminated unsaturated polyester which can be utilized is a poly(propylene maleate/fumarate) which is about 99.1 percent fumarate polyester which is sold by GenCorp under the designation B550-125A-12. The resulting graft copolymer has been found to achieve a balance between shrinkage and surface characteristics, and mechanical properties, which provides a combination of properties which might be desirable for certain applications.

In order to achieve adequate shrinkage and good surface characteristics of the cured invention, it has been found that compatibilizing agents must also be added to the thermosetting composition. It is believed that the compatibilizing agents improve the solubility of the low profile additive in the uncured thermosetting composition which contains mostly unsaturated polyester and a suitable vinyl addition crosslinking agent such as styrene monomer. This increased solubility with the uncured thermosetting composition is, in turn, believed to promote uniform distribution of the low profile additive throughout the uncured thermosetting composition and to inhibit agglomeration of the low profile additive, thus ensuring uniform properties, and small particle size for the low profile additive. The compatibilizing agent may also promote adhesion between the low profile additive which exists as a dispersed particulate phase and the surrounding matrix, to ensure that cavitation during shrinkage of the curing polyester occurs predominately within the elastomeric low profile additive rather than at the interface between the low profile additive and the cured polyester matrix.

The compatibilizing agent which functions to retard shrinkage is generally a copolymer having a first constituent which is compatible or reactive with the unsaturated polyester of the uncured thermosetting composition, and a second constituent which is compatible with the elastomer of the low profile additive. The compatibility of the compatibilizer with both the low profile additive and the unsaturated polyester helps to promote uniform distribution of the low profile additive and to minimize the particle sizes of the low profile additive. The compatibilizing agent is preferably a graft copolymer wherein the polyester compatible constituents are grafted or adducted to a flexible polymer backbone. The backbone is generally formed from monomeric units similar to or more preferably identical with those used to form the elastomer of the low profile additives and the same is hereby incorporated. Polybutadiene is the preferred backbone for the graft copolymer compatibilizer, however, the backbone polymer of the compatibilizing agent can generally be any type of rubber such as one made from one or more conjugated dienes having 4 to 10 carbon atoms, nitrile rubber forming monomers, hydrogenated diene rubbers, and the like. The molecular weight of the flexible polymer backbone is generally from about 1,000 to 10,000 and preferably from about 4,000 to 8,000. The polyester compatible constituents which are grafted to the flexible polymer backbone are preferably formed by adding on to the flexible backbone, and polymerizing or oligomerizing anhydride monomers having 4 to 10 carbon atoms, with maleic anhydride being preferred. An example is maleic anhydride modified polybutadiene Ricon 131MA17 manufactured by Colorado Chemicals Co. The addition of the anhydride is via an addition mechanism using suitable free radical initiators known to the art and to the literature.

Alternatively, the compatibilizing agent can be a di- or triblock copolymer having a flexible polymer block which is compatible with the elastomer of the low profile additive, and a polyester or polyanhydride block which is compatible with the unsaturated polyester before curing.

The amount of compatibilizer utilized depends on the amount of low profile additive used and is generally that amount sufficient to promote good dispersion of the low profile agent within, and good adhesion of the low profile agent with, the polyester matrix. Generally, the amount of compatibilizer used is from about 5 to about 25 percent, and preferably from about 10 to about 15 percent by weight, based on the total weight of the low profile additive and the compatibilizing agent.

The unsaturated polyester resins in which the low-profile additives of the invention can be utilized are well known in the art and include those derived by condensation of unsaturated dibasic acids or anhydrides containing 4 to 9 carbon atoms with polyols including dihydroxy and trihydroxy compounds containing 2 to 12 carbon atoms. The polyester may include in the polymeric chain varying proportions of other saturated or aromatic dibasic acids and anhydrides which are not subject to crosslinking. Examples of unsaturated dibasic acids include maleic, chloromaleic and fumaric acid with maleic anhydride, maleic acid, and fumaric acid being preferred. Aromatic and saturated acids and anhydrides which are exemplary of noncrosslinking moieties within the unsaturated polyester copolymer include phthalic anhydride, or thiophthalic acid, isophthalic acid, terephthalic acid, endomethylenetetrahydrophthalic anhydride, tetrachlorophthalic anhydride, adipic acid, succinic acid, and the like. Any of a variety of well known polyols including di- and trihydroxy compounds containing 2 to 9 carbon atoms can be used for condensation with the diacids to produce unsaturated polyesters which can be used advantageously with the invention. Examples include ethylene glycol, propylene glycol, 1,2, 1,3 and 1,4-butadienols, neo-pentyl glycol, diethylene ether diol, trimethylol propane, and the like with propylene glycol being preferred. Various well known method may be employed to produce unsaturated polyesters which are suitable for use with the invention.

The crosslinkable polyester resin systems in which the elastomeric low-profile additives of the invention can be utilized generally comprise a solution formed by dissolving the unsaturated polyester in a solvent comprising at least one polymerizable monomer which is copolymerizable with the dissolved polyester, i.e. the polymerizable monomer acts both as a solvent and a reactant which copolymerizes with the unsaturated groups along the polyester chain. Polymerizable monomers which can be utilized as a combination solvent and crosslinker agent for unsaturated polyesters include ethylenically unsaturated compounds containing from 3 to 12 carbon atoms. Examples of suitable crosslinker monomers include styrene, α-methylstyrene, methylmethacrylate, vinyl acetate, allyl esters of phthalic, adipic, maleic, malonic and cyanuric acids, with styrene being preferred. Commercially available unsaturated polyester resins which are normally sold as a liquid solution can be used with the low-profile additives of the invention.

The cured article formed by using the low profile additives and compatibilizing agents, in a generally otherwise conventional unsaturated polyester thermosetting composition, in accordance with the invention, provides a cured article having unique characteristics and morphology, wherein the low profile additive exists as small discrete particles distributed throughout the matrix, and with shrinkage compensation occurring substantially through cavitation or void formation within the individual particles of the low profile additive. Further, it has been found that the low profile additive particles, dispersed throughout cured articles formed from thermosetting compositions in accordance with the invention, generally have high probability of containing voids. That is, generally at least 50 percent, desirably at least 70 percent, and preferably at least 80 percent or 90 percent of the particles have at least one void therein. Because the voids are hidden within the tough elastomeric low profile additive, mechanical properties such as impact strength are not reduced to a significant extent. In particular, the cured articles made in accordance with the principles of the invention generally have a fracture toughness which is at least 70 percent, desirably at least 75 or 80 percent, and preferably at least 90 percent, and in certain instances at least about 100 percent, of the fracture toughness of a cured article formed from a thermosetting composition which does not have any low profile additive but which is otherwise identical with the invention. The fracture toughness, that is $K_{1c}$, of the cured compositions of the present invention is generally at least 0.35; desirably at least 0.40; and preferably at least 0.45 M-Pa-m$^{\frac{1}{2}}$.

The particle size of the low profile additive is important to the surface characteristics of the cured polyester article and once it has been dispersed with the compatibilizing agent in the unsaturated polyester and cured, it generally is less than 20 microns, preferably from about 0.5 to about 10 microns, and more preferably is from about 0.5 to about 5 microns in size. These lower particle sizes generally provide smoother surfaces which are desired for automotive body panels, for example.

The thermosetting molding compositions of the present invention containing the curable unsaturated polyester, the ethylenically unsaturated crosslinking agent, the low profile additive of the present invention and the compatibilizin agent once mixed have good phase stability, that is they are shelf stable for extended periods of time as up to about 8, 10 and even 12 or 15 hours. In other words, the low profile additive exists as small discrete particles for such periods of time.

Fibers can be added to the composition for added strength and stiffness. Examples of fibers which can be utilized in this invention generally include any reinforcing fiber such as glass, aramid, nylon, polyester, graphite, boron, and the like. Fiber structure suitable for incorporation into the matrix include generally individual fibers, various types of woven fibers, or any general type of nonwoven fibers. Included within the woven class is any general type of woven fabrics, woven roving, and the like. Generally included within the nonwoven class are chopped strands, random or wound continuous filaments or rovings, reinforcing mats, nonreinforcing random mats, fiber bundles, yarns, non-woven fabrics, etc. Coated fiber bundles, comprising about 5 to about 50 or 150 strands, each having about 10 to about 50 fibers, bonded together with conventional sizing agents such as various amino silanes, are preferred. Chopped glass fibers are preferred with a desirable length of 0.5" to 2.0" and preferably 1". The fibers may comprise from about 5 percent up to about 60 percent by weight of the composite and preferably from 20 percent to 50 percent by weight of the composite. The specific quantity of fiber structure in the composite can be varied consistent with the physical properties desired in the final composite molded article.

Other additives which can also be utilized in effective amounts are known to the art and to the literature and include internal mold release agents such as zinc stearate; viscosity reducers or viscosity modifiers; free radical inhibitors; mineral fillers such as calcium carbonate, Dolomite, clays, talcs, zinc borate, perlite, vermiculite, hollow glass spheres, solid glass microspheres, hydrated alumina, carbon black, and the like. Often calcium carbonate is used in substantial amounts. Viscosity modifiers can be compounds such as MgO dispersions that thicken the unsaturated polyester resins during aging. The typical viscosity reducers used in this specification are long chain aliphatic monocarboxylic acids or saturated polyesters with acid groups. The fillers can be present from 0 to about 80 weight percent, and desirably from 20–70 weight percent of the total composition weight. Free radical inhibitors are included to modify cure cycles by providing cure delay and moderating the cure exotherm. These free radical inhibitors can be present from 0.001 to 0.2 parts per 100 parts by weight of unsaturated polyester resins or vinyl ester resins and ethylenically unsaturated monomers in the composition. The free radical inhibitors include benzoquinone, hydroquinone, and similar substituted quinones.

Conventional catalysts can be used to cure the composition containing the unsaturated polyester. Examples of such catalysts include organic peroxides and hydroperoxides such as benzoyl peroxide, dicumyl peroxide, cumene hydroperoxide, tert-butylperbenzoate, paramenthane hydroperoxide, and the like, used alone or with redox systems; diazo compounds such as azobisisobutyronitrile, and the like; persulfate salts such as sodium, potassium, and ammonium persulfate, used alone or with redox systems; and the use of ultraviolet light with photo-sensitive agents such as benzophenone, triphenylphosphine, organic diazos, and the like. When curing is done in a mold at elevated temperatures, then the temperature can desirably vary from about 30° C. to about 160° C. and is preferably from about 80° C. to about 150° C. Alternatively, when photo sensitive agents are used, lower temperatures can be used. The amount of catalyst used can vary from about 0.1 to about 5 parts and is desirably 0.5 to about 2.0 parts by weight per 100 parts of resins and polymer forming components in the composition.

The general procedure for mixing the composition of the present invention involves dissolving the unsaturated polyester, and any other polymeric components in the ethylenically unsaturated monomer. The composition is then well mixed. The catalyst for the free radical crosslinking reaction can be added to the mix at any of the various stages so long as the temperature of the mix is not so high as to start free radical crosslinking. Fillers can also be added at this stage.

Compositions made in accordance with the invention can be utilized in resin transfer molding, bulk molding, sheet molding, thick molding, and the like. The composite material of the invention provides a toughened molding material having better crack resistance, fracture toughness, strength and modulus and can be molded as automotive components, e.g. body panels and automotive structural components (such as load bearing support members), aircraft components, housings for various electrical and household goods, and sporting goods.

The invention will be more fully understood from the following illustrative examples, wherein various low profile additives or low profile additive systems are compared to each other and to a similar composition which is free of low profile additives. In each example, cured articles were formed from a curable polyester composition consisting of an unsaturated polyester, styrene crosslinker, curing agents, and a low profile additive or low profile additive system. The unsaturated polyester used in each example was Aristech MR13006 available from Aristech Chemical. Aristech MR13006 is an unsaturated polyester supplied as a 60 percent by weight solution in styrene, and is comprised of 30 percent by weight propylene glycol, 7 percent by weight ethylene glycol, 4 percent by weight dipropylene glycol, 6 percent by weight maleic acid, and 53 percent by weight fumaric acid. In each example, the Aristech MR13006 was mixed with an amount styrene needed to raise the molar ratio of styrene to unsaturation in the unsaturated polyester to about 3.5. The curing agents for each example comprised 1.0 phr of tert-butyl perbenzoate, 0.5 to 1.0 phr of methyl ethyl ketone peroxide as a 50 percent by weight solution in dimethyl phthalate, and 0.05 to 0.10 phr of cobalt naphthenate as a 6 percent by weight solution in mineral spirits and hexylene glycol. To simplify the comparison between the various low profile additives, fillers, fibers, mold release agents and maturation agents, all of which are normally present in polyester molding compounds, were not used in any of the examples.

For each of the following examples the unsaturated polyester, styrene and curing agents were mixed in the amounts set forth above along with one of the various low profile additives or low profile additive systems, degassed and then cast in vertical molds which were air oven cured for 2 hours at 85° C., then 1 hour at 120° C. and finally for 1 hour at 140° C.

EXAMPLE 1

Because the object of the present invention is to find a low profile additive which achieves low or no shrinkage, provides a cured article having a class A surface finish, and retains the inherent mechanical properties of polyester, a control, comprising castings formed from a molding composition as set forth above but free of any low profile additives was prepared.

EXAMPLE 2

A second control, representative of the most commonly used low profile additives, was prepared by adding a poly(vinyl acetate) available from Union Carbide and sold under the trademark "Neulon T+" to the curable polyester composition set forth above. The amount of "Neulon T+" used was 35 percent by weight based on the combined weight of the unsaturated polyester, the styrene and the poly(vinyl acetate). Thus, the amount of the poly(vinyl acetate) which was added was 14 percent by weight.

EXAMPLES 3-4

Examples 3 and 4 establish that unmodified styrene-butadiene block copolymers, which are commonly used to enhance toughness, do not provide adequate low profile effect by themselves. For Example 3, "KRATON D1300X" was added to the curable polyester composition as previously set forth. The amount of "KRATON D1300X" used was 7 percent by weight based on the combined weight of the unsaturated polyester, the styrene, and the "KRATON D1300X" For Example 4, "Stereon 840A" was used in the curable polyester composition in an amount so that the "Stereon 840A" represented 7 percent of the combined weight of the unsaturated polyester, the styrene, and the "Stereon 840A".

EXAMPLES 5-8

Examples 5-8 establish that epoxidized styrene-butadiene block copolymers by themselves do not provide adequate low profile effect. Examples 5-8 were prepared in a manner similar to Examples 4 and 5, using the same amounts of unsaturated polyester, styrene, and styrene-butadiene block copolymers, except that the styrene-butadiene block copolymers were epoxidized. For Example 5, "Kraton D1300X" was 1 percent epoxidized with n-chlorperbenzoic acid. The level of epoxidation is expressed as the mole percent of the butadiene units converted to epoxy groups. For Example 6, "Kraton D1300X" was 10 percent epoxidized, and for Examples 7 and 8, "Stereon 840A" was epoxidized to 0.2 percent and 12.5 percent epoxidation, respectively. In each of Examples 5-8, the amount of epoxidized styrene-butadiene block copolymer used was such that the styrene-butadiene block copolymer represented 7 percent of the combined weight of the unsaturated polyester, the styrene and the epoxidized styrene-butadiene block copolymer.

EXAMPLES 9 AND 10

Examples 9 and 10 establish that unmodified styrene-butadiene block copolymers even when used in conjunction with a compatibilizing agent do not provide adequate low profile effect. Example 9 is a curable polyester composition as set forth above except that unmodified "Kraton D1300X" was added such that the "Kraton D1300X" represents 7 percent of the combined weight of the polyester, styrene and "Kraton D1300X", and a compatibilizing agent was added such that the compatibilizing agent represents 0.93 percent by weight of the combined weight of the polyester, styrene and Kraton D1300X". Example 10 is identical to Example 9, except that unmodified "Stereon 840A" was substituted for "Kraton D1300X".

The compatibilizing agent used in Examples 9 and 10 was a low molecular weight polybutadiene adducted with maleic anhydride. The compatibilizing agent is commercially available from Colorado Chemicals and sold under the trademark "RICON 131MA17". "RICON 131MA17" has a number average molecular weight of 6,500, with 20 percent 1,2-butadiene units and 80 percent 1,4 cis and 1,4 trans butadiene units. Seventeen percent by weight of the 1,4 units were modified with maleic anhydride, i.e. approximately 11 maleic anhydride groups per molecule.

EXAMPLES 11 AND 12

Examples 11 and 12 represent preferred embodiments of the invention wherein the low profile additive system of the invention, comprising an epoxidized styrene-butadiene block copolymer and the maleic anhydride-polybutadiene ("RICON 131MA17") compatibilizing agent, are utilized. Examples 11 and 12 are generally identical with Examples 9 and 10, respectively, except that in the case of Example 11, the "KRATON D1300X" is 10 percent epoxidized and in the case of Example 12 the "STEREON 840a" is 10 percent epoxidized.

For each of the above Examples, the plane-strain fracture toughness, $K_{1C}$, was determined in accordance with ASTM E399-83. Tensile strength (UTS), Young's Modulus (E) and strain-to-failure (Ef) were determined for each of the Examples using the procedures of ASTM D638-87.

Each of the above Examples was evaluated for its low profile effect via casting. For purposes of this evaluation, low profile effect was treated as a combination of shrinkage and surface appearance. Shrinkage was assessed only to the extent of determining whether the molding composition shrunk, expanded, or fit the mold exactly after curing. Compositions which did not shrink during curing met the first criterion for being judged as having acceptable low profile effect. Those compositions which shrunk were judged to have unacceptable low profile effect. Surface appearance was subjectively judged by evaluating the sharpness of a reflected image of a nearby grid. Only those cured compositions which did not shrink and which exhibited very smooth surfaces were rated as having acceptable low profile effect.

The results for the mechanical properties and low profile characteristics for each of the Examples were summarized in Table 1.

The results show that polyvinyl acetate, while exhibiting excellent surface appearance and low profile effect, causes a substantial reduction in fracture toughness (K1C) and other mechanical properties. Unmodified styrene-butadiene block copolymers exhibit good mechanical properties but provide poor low profile effect. Both the epoxidized styrene-butadiene block copolymers (Examples 5-8) and the unmodified styrene-butadiene block copolymers used with the maleic anhydride-butadiene compatibilizing agent (Examples 9 and 10 exhibited better low profile effect while retaining good mechanical properties; however, none of these Examples (5-10) provided the very smooth surfaces required for certain applications such as for automotive body panels.

The results show that only Examples 11 and 12, which are in accordance with the invention, provide excellent low profile effects with very smooth surfaces while exhibiting significantly better mechanical properties than do compositions employing polyvinyl acetate low profile additives.

Table II is similar to Table I except that it relates to the various compositions which were molded. As apparent from Table II, Examples 16 and 17 which contain the compatibilizing agent exhibit the good mechanical properties as well as a smooth surface appearance.

TABLE I

| EX | LPA[1] | AMT OF LPA[2] | COMPAT-IBILIZER | AMT OF COMPAT-IBIL-IZER[3] | $K_{1c}$[4] | UTS[5] | E[6] | Ef[7] | SHRINK-AGE | APPEAR-ANCE | LPA EFFECT |
|---|---|---|---|---|---|---|---|---|---|---|---|
| | | | | CASTINGS | | | | | | | |
| 1 | None | — | — | — | 0.538 | 37.87 | 3.95 | 1.08 | Shrinks | — | Unacceptable |
| 2 | Polyvinyl Acetate | 14% | — | — | 0.301 | 15.44 | 2.32 | 0.707 | Expands | Very Smooth | Acceptable |
| 3 | KRATON D1300X | 7% | — | — | 0.596 | 12.70 | 2.11 | 0.602 | Fits Exactly | Rough | Unacceptable |
| 4 | STEREON 840A | 7% | — | — | 0.652 | 13.06 | 2.03 | 0.711 | Fits Exactly | Rough | Unacceptable |
| 5 | 1% Epoxidized KRATON D1300X | 7% | — | — | 0.644 | 12.04 | 2.73 | 0.482 | Fits Exactly | Slightly Rough | Unacceptable |
| 6 | 10% Epoxidized KRATON D1300X | 7% | — | — | 0.622 | 11.51 | 2.77 | 0.459 | Fits Exactly | Slightly Rough | Unacceptable |
| 7 | 0.2% Epoxidized STEREON 840A | 7% | — | — | 0.543 | 9.75 | 2.51 | 0.483 | Fits Exactly | Smooth | Unacceptable |
| 8 | 12.5% Epoxidized STEREON 840A | 7% | — | — | 0.588 | 8.80 | 2.55 | 0.460 | Expands | Smooth | Unacceptable |
| 9 | KRATON D1300X | 7% | RICON131MA17 | 0.93 | 0.532 | 12.10 | 2.05 | 0.674 | Fits Exactly | Smooth | Unacceptable |
| 10 | STEREON 840A | 7% | RICON131MA17 | 0.93 | 0.437 | 20.59 | 2.45 | 0.930 | Fits Exactly | Smooth | Unacceptable |
| 11 | 10% Epoxidized KRATON D1300X | 7% | RICON131MA17 | 0.93 | 0.447 | 15.81 | 2.55 | 0.749 | Fits Exactly | Very Smooth | Acceptable |
| 12 | 10% Epoxidized STEREON 840A | 7% | RICON131MA17 | 0.93 | 0.408 | 22.15 | 2.51 | 1.074 | Fits Exactly | Very Smooth | Acceptable |

[1]Low profile additive used
[2]Based on the combined weight of the unsaturated polyester, styrene and LPA
[3]Based on the combined weight of the unsaturated polyester, styrene and LPA
[4]In units of MPa-m$^{\frac{1}{2}}$
[5]In units of MPa
[6]In units of GPa
[7]Strain to failure in percent elongation

TABLE II

| EX | LPA[1] | MOLDED SMC AMT OF LPA[2] | COMPAT-IBILIZER | AMT OF COMPAT-IBIL-IZER[3] | CASTINGS $K_{1c}$[4] | UTS[5] | E[6] | Ef[7] | Ex-pansion (Mils/in) | Surface Undula-tions (Microns) | Surface Smooth-ness |
|---|---|---|---|---|---|---|---|---|---|---|---|
| 13 | PVAC | 14% | — | — | NA | 144 ± 31 | 7.10 ± 1.03 | 2.39 ± 0.40 | 1.2 | ~0.1 to 0.2 | Good |
| 14 | KRATON D1300X | 7% | — | — | NA | 138 ± 30 | 6.90 ± 0.83 | 2.32 ± 0.36 | 0.4 | ~1 to 5 | Poor |
| 15 | STEREON 840A | 7% | — | — | NA | 149 ± 27 | 7.24 ± 0.90 | 2.30 ± 0.22 | 0.3 | ~1 to 5 | Poor |
| 16 | 5% Epoxidized KRATON D1300X | 7% | RICON | 0.93 | NA | 163 ± 75 | 7.38 ± 1.17 | 2.40 ± 0.20 | 0.5 | ~0.1 to 0.2 | Good |
| 17 | 5% Epoxidized STEREON 840A | 7% | RICON | 0.93 | NA | 174 ± 39 | 7.86 ± 1.66 | 2.54 ± 0.33 | 0.3 | ~0.1 to 0.2 | Good |

While in accordance with the Patent Statutes, the best mode and preferred embodiment has been set forth, the scope of the invention is not limited thereto, but rather by the scope of the attached claims.

What is claimed is:

1. A low profile additive system for a thermosetting composition, comprising;

a low profile additive which is an epoxidized elastomer having a number average molecular weight from 15,000 to 200,000 before epoxidation polymerized from at least one conjugated diene monomer, and/or an epoxidized thermoplastic block copolymer having at least one flexible block having a number average molecular weight from 15,000 to 120,000 polymerized from one or more conjugated diene monomers having from 4 to about 12 carbon atoms and having at least one monovinyl aromatic block polymerized from at least one monovinyl aromatic monomer having from 8 to about 12 carbon atoms;

and about 5 to 25 weight percent of a compatibilizing agent based upon the weight of the low profile additive and compatibilizing agent, which compatibilizing agent is a copolymer having at least a first constituent of grafted or adducted, dicarboxylic anhydride or polymerized dicarboxylic anhydride or combinations thereof having 4 to 10 carbon atoms per anydride or is a polyester, which first constituent is compatible or reactive with unsaturated polyesters, and at least a second constituent which is a polymer of number average molecular weight from 1,000 to 10,000 from at least one conjugated diene and optionally from addition polymerizable monomers and being compatible with the elastomer or the flexible block of the low profile additive.

2. The low profile additive system of claim 1, wherein each monovinyl aromatic block has a number average molecular weight of from about 10,000 to about 50,000; wherein the degree of epoxidation of the epoxidized elastomer or the epoxidized thermoplastic block copolymer is from about 0.5 percent to about 30 percent of the total number of unsaturated groups in the elastomer and/or the at least one flexible block of the thermoplastic block copolymer.

3. The low profile additive system of claim 2, wherein the low profile additive is an epoxidized thermoplastic block copolymer of styrene and butadiene, and wherein the amount of the epoxidation is from about 1 to about 15 percent.

4. The low profile additive system of claim 1, wherein the diene polymer backbone of the second constituent of the compatibilizing agent is made from a conjugated diene having from 4 to 10 carbon atoms with the grafted or adducted constituent being a dicarboxylic anhydride molecule having from 4 to about 10 carbon atoms, or an oligomer thereof, or a low molecular weight polymer segment thereof, or combinations thereof.

5. The low profile additive system of claim 3, wherein the second constituent of the compatibilizing agent is made from a conjugated diene having from 4 to 10 carbon atoms with the grafted or adducted constituent being a maleic anhydride molecule or an oligomer thereof, or a low molecular weight polymer segment thereof, or combinations thereof.

6. The low profile additive system of claim 5, wherein the amount of the compatibilizing agent is from 10 percent to about 15 percent by weight.

* * * * *